United States Patent [19]

Taylor

[11] Patent Number: 4,527,893
[45] Date of Patent: Jul. 9, 1985

[54] METHOD AND APPARATUS FOR OPTICALLY MEASURING THE DISTANCE TO A WORKPIECE

[76] Inventor: Francis M. Taylor, 1620 Charlton Mill Rd., Xenia, Ohio 45385

[21] Appl. No.: 434,200

[22] Filed: Oct. 13, 1982

[51] Int. Cl.$^3$ ............................................. G01C 3/08
[52] U.S. Cl. ...................................... 356/4; 354/403; 350/6.7
[58] Field of Search ............ 356/4, 369; 250/201 AF, 250/204; 354/403; 350/607

[56] References Cited

U.S. PATENT DOCUMENTS

| | | |
|---|---|---|
| 3,137,756 | 6/1964 | Gunther et al. . |
| 3,327,584 | 6/1967 | Kissinger . |
| 3,385,159 | 5/1968 | Bliss et al. . |
| 3,486,826 | 12/1969 | Colvin et al. ............... 356/152 |
| 3,715,165 | 2/1973 | Smith ........................ 356/369 |
| 3,719,421 | 3/1973 | Poilleux et al. . |
| 3,788,741 | 1/1974 | Buechler . |
| 3,847,485 | 11/1974 | Zanoni ....................... 356/369 |
| 4,269,491 | 5/1981 | Hagyuda et al. ............. 356/4 |
| 4,336,997 | 6/1982 | Ross et al. ................. 356/4 |

Primary Examiner—S. C. Buczinski
Assistant Examiner—Gregory C. Issing
Attorney, Agent, or Firm—Biebel, French & Nauman

[57] ABSTRACT

The point of focus of an image is swept through a measurement zone in the image space of a lens system by sweeping a plurality of convex specular surfaces through the object space of the lens system to vary the object space. The specular surfaces are formed to approximate involute curves and the optical axis of the lens system is centered upon tangents to a generating circle of the involute curves which are approximated by the specular surfaces. The specular surfaces are mounted in a rotating member and sweep the object space by rotation of the rotating member about the center of the involute generating circle. An object of the lens system includes a light emitter and a light detector positioned adjacent to one another. As the measurement zone is swept, a minimum of the output signal from the light detector occurs when the image is momentarily in focus upon the surface of a workpiece within the measurement zone. The dimension of the object space upon focus is determined by monitoring the angular orientation of the specular surfaces and this angular orientation is utilized to determine the distance to the surface of the workpiece.

13 Claims, 9 Drawing Figures

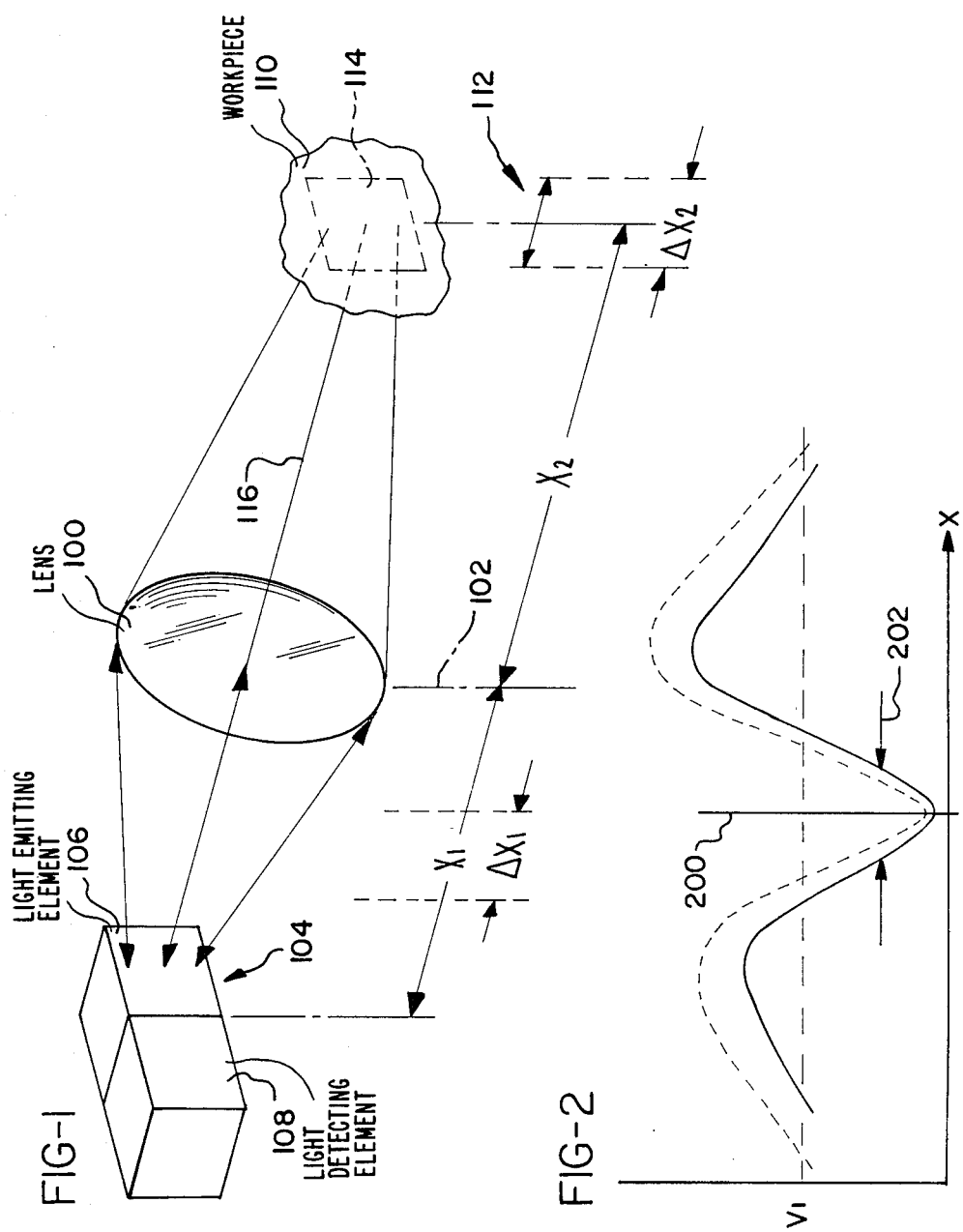

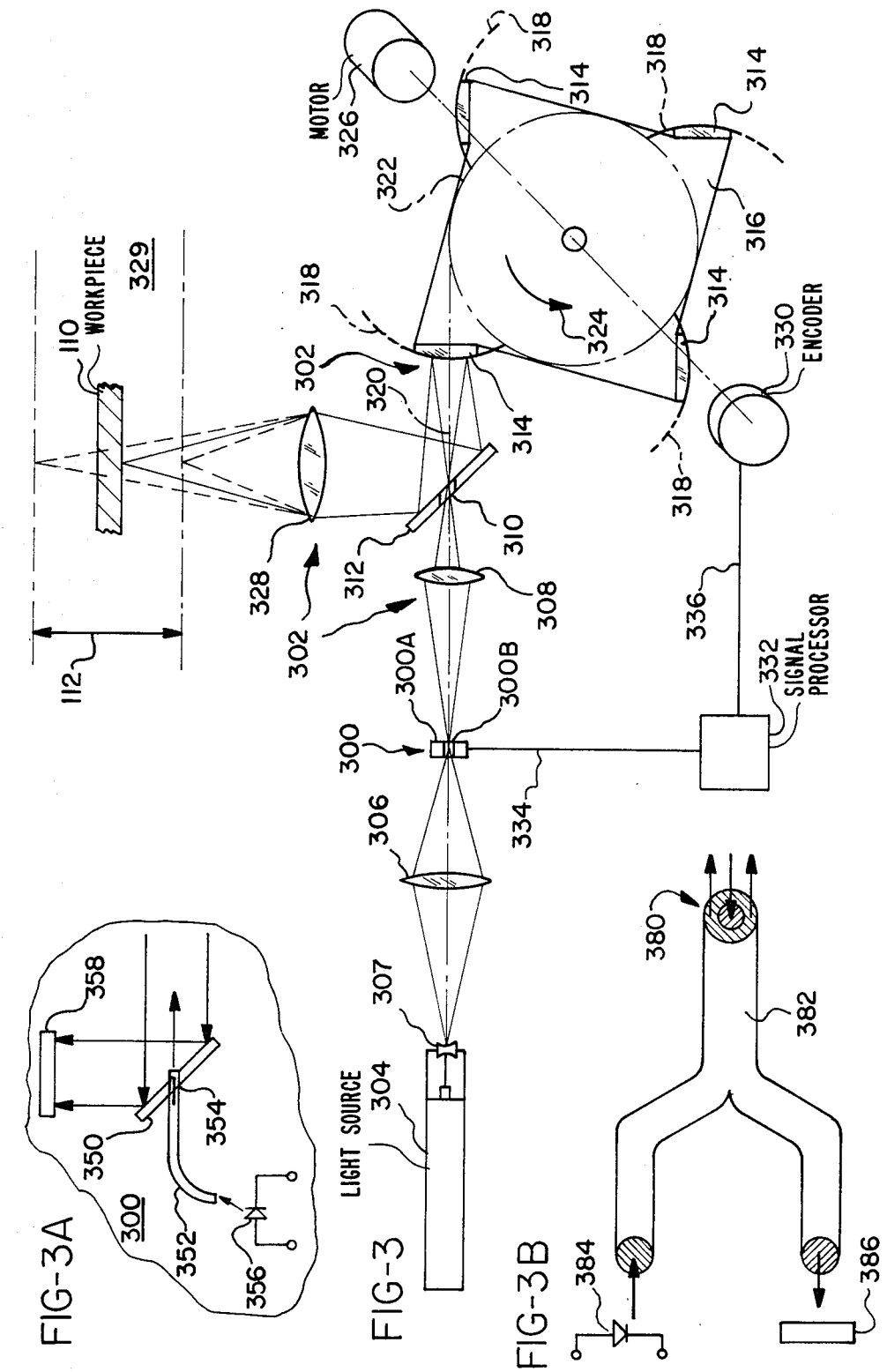

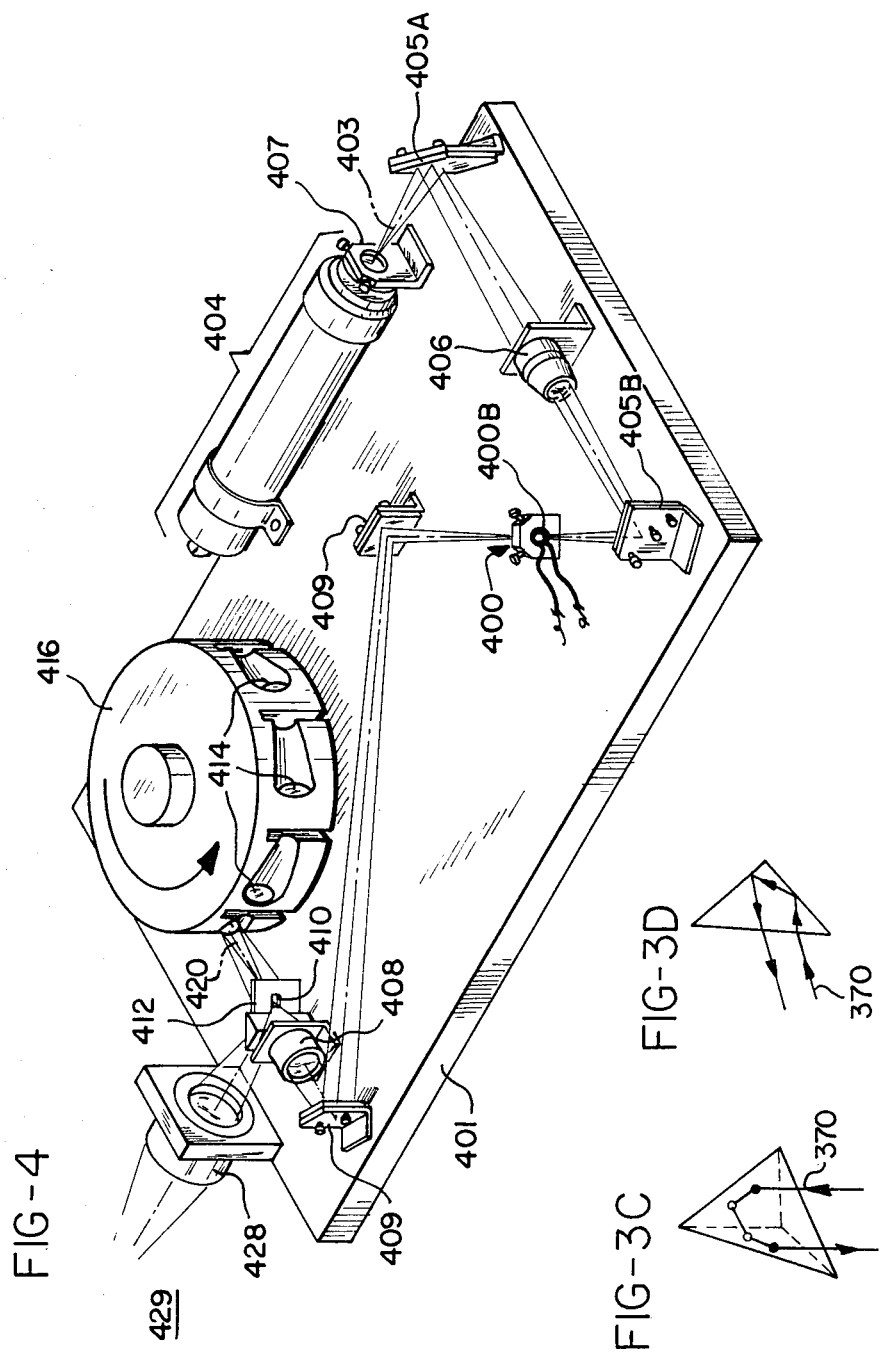

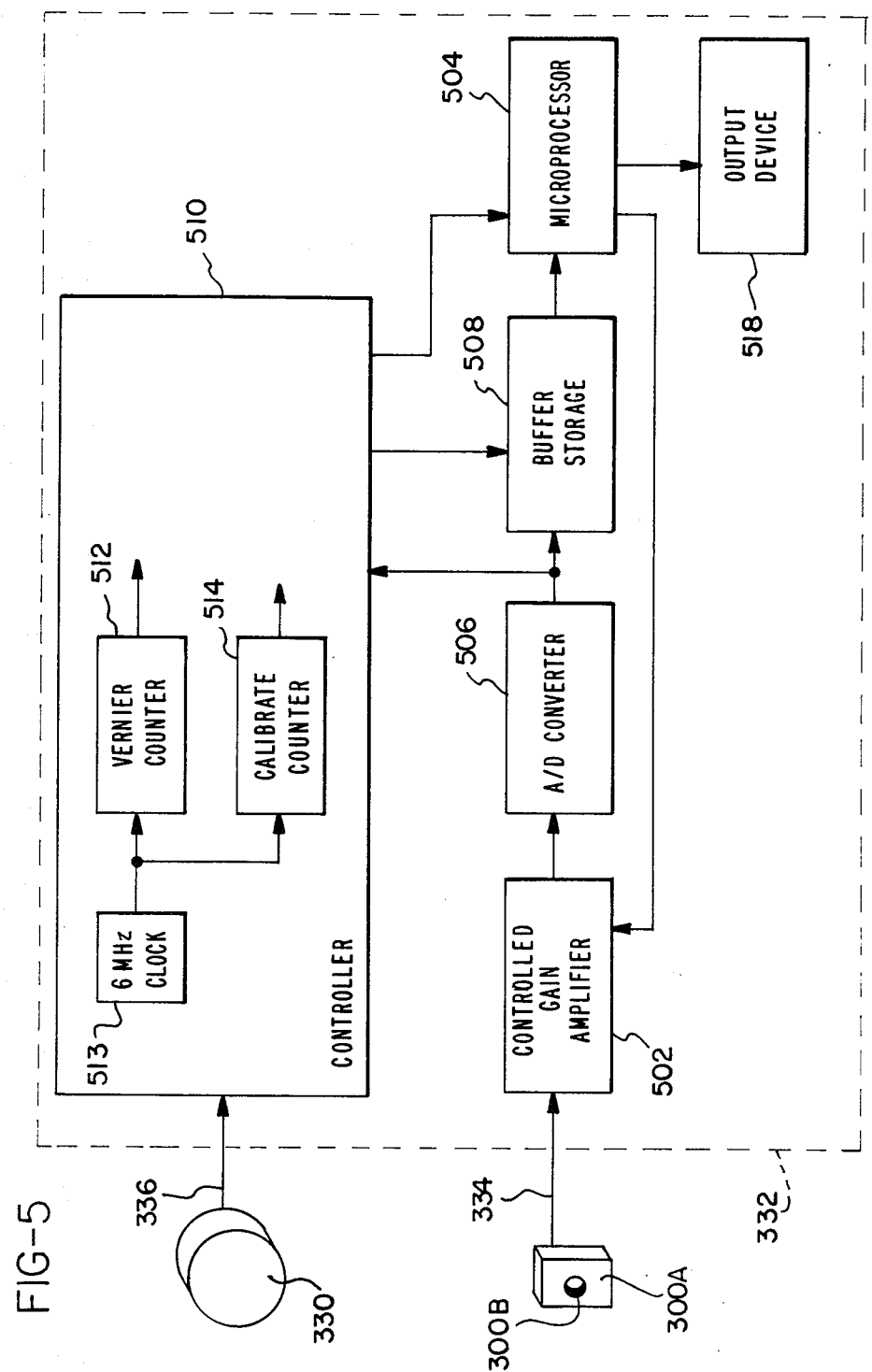

METHOD AND APPARATUS FOR OPTICALLY MEASURING THE DISTANCE TO A WORKPIECE

BACKGROUND OF THE INVENTION

This invention relates generally to optical distance measuring devices and, more particularly, to a method and apparatus for optically measuring the distance to a workpiece by means of sweeping the image space of a lens system by varying the object space of that lens system by utilizing a specular involute surface.

A variety of optical distance measuring devices are known in the prior art. For example, a fiber optic probe having a plurality of transmitting fibers and a plurality of receiving fibers, also known as a bifurcated fiber optic probe, may be used to determine the distance of an object from the end of the probe by measuring the light received by the light receiving fibers. However, the accuracy of this type of probe is dependent upon the reflectivity of the surface being probed and such probes must work very close to the surface being measured.

In accordance with another prior art device, geometric patterns are focused at a pair of discrete axially spaced planes. The geometric shapes form one relatively dark area adjacent to a light or illuminated area. A detector or pair of detectors responsive to the light falling in the dark areas of the patterns generates electrical signals which vary in accordance with the variations in distance of the object to be sensed from each of the planes. In accordance with this prior art device, the signals generated by the detector or detectors corresponding to the two focus planes are compared to provide a signal indicative of the axial spacing of the object from the median distance between the planes of focus.

In all known prior art devices for optical distance measuring, various problems arise since the measurement process is based upon the intensity of the light returned from the target surface and are thus dependent upon the reflectivity of the object to be sensed. While the variations in reflectivity can be compensated, compensation techniques add complexity to the devices and are approximate at best such that high precision cannot be obtained with the systems.

It is, thus, apparent that the need exists for an improved optical distance measuring device which provides an accurate high speed measurement of the positions of a surface within a measurement range regardless of the type of material, surface structure, reflectivity or color of the surface being measured.

SUMMARY OF THE INVENTION

In accordance with the present invention, distance measuring apparatus determines the distance of a workpiece from the apparatus by positioning the workpiece within a measurement range defined within the image space of a lens system. Light emitting means for providing a source of light is positioned as an object of the lens system and detector means are provided for monitoring the image of the object upon the workpiece, said detector means generating electrical signals indicative of the focus of the image upon the workpiece. Sweep means are provided along the optical axis of the lens system for varying the object space of the lens system thereby to sweep repeatedly the point of focus of the object in the image space of the lens system through a defined distance which determines the limits of the measurement range or zone. Sensing means are provided for determining the dimensions of the object space as it is varied and control means monitor the electrical signals from the detector means and the sensing means to determine the object space dimension upon detection of the point of focus of the image of the object upon the workpiece. Since the relation between the object space and the image space is known for the lens system, the dimension of the object space defines the dimension of the image space upon focus and, hence, the distance of the workpiece from the measuring apparatus.

In the preferred embodiment of the present invention, the sweep means comprises at least one specular surface formed to approximate an involute curve and mounted for rotation such that the optical axis of the lens system is centered upon the tangent to a generating circle of the involute curve, and drive means for rotating the specular surface about the center of the generating circle. To increase the number of measurements which can be made over a given period of time, a plurality of such specular surfaces are positioned within a rotatable member and swept through the optical axis of the lens system.

In an alternate embodiment of the present invention, the sweep means comprises at least one corner cube reflector mounted for rotation through the optical axis of the lens system. Here again, the number of measurements which can be made over a given period of time can be increased by providing a plurality of such reflectors within a rotatable member which sweeps the reflectors through the optical axis of the lens system upon rotation.

Also in the preferred embodiment of the present invention, the detector means or light sensing means is positioned adjacent to the light emitting means for receiving light emitted from the light emitting means after it has been reflected back through the lens system from the workpiece or retroreflected. For example, the object for the lens system can be constructed from light detecting material having a hole formed therethrough to permit a light beam to be projected through the hole. In this way, the light emitting means comprises the light beam projected through the hole and the light detecting material comprises the adjacent detector or light sensing means. The correlation means preferably comprises a computer.

Also disclosed is a method for measuring the position of a workpiece within a zone of measurement comprising the steps of varying the object space of a lens system to sweep repeatedly the image space of the lens system through a corresponding distance which defines the zone of measurement; determining the dimensions of the object space as the image space is swept; positioning a light source as an object along the optical axis of the lens system; positioning a light detecting element to receive light which originates at the light source and is retroreflected through the lens system from the workpiece, said light detecting element generating an electrical signal representative of the light incident thereon; monitoring the electrical signal generated by the light detecting element to detect a minimum of the electrical signal which minimum corresponds to the point of focus of the image of the light source upon the workpiece; and coordinating the point of image focus and the corresponding object space dimension to determine the position of the workpiece within the zone of measurement. Preferably, the light source and the light detecting element are formed such that they are effectively adjacent to one another.

The step of varying the object space can comprise moving a specular surface within the object space. Preferably, the step of moving the specular surface within the object space comprises the steps of forming the specular surface to substantially define an involute curve; mounting the specular surface for rotation such that the optical axis of the lens system is centered upon the tangent to a generating circle of the involute curve when the specular surface is rotated about the center of the generating circle; and rotating the specular surface to sweep repeatedly the image space of the lens system. Alternately, the specular surface can be formed as a corner cube reflector.

The dimensions of the object space are determined by monitoring the angular orientation of the specular surface which can be translated into object space dimensions. Definition of the angular orientation of the specular surface comprises encoding the angular displacement of the specular surface as it is rotated to generate angular displacement signals; counting pulses from a high speed clock to serve as a vernier between consecutive angular displacement signals; and calibrating the vernier in correspondence with clock counts recorded between at least two consecutive ones of the angular displacement signals. The correspondence between the angular orientations of the specular surface and the position of the workpiece within the zone of measurement is preferably performed by an initial calibration. During calibration, a correspondence table is formed which is then stored in a permanent memory. Upon the determination of the angular orientation of the specular surface at the point of image focus upon the workpiece, the table is read to find the position of the workpiece which corresponds to that angular orientation.

It is, therefore, an object of the present invention to provide an improved method and apparatus for optically measuring the distance to a workpiece by means of sweeping the image space of a lens system by varying the object space of that lens system through known object space dimensions.

It is another object of the present invention to provide an improved method and apparatus for optically measuring the distance to a workpiece wherein the object space of a lens system is swept by means of a specular surface which is formed to approximate an involute curve and is mounted for rotation such that the optical axis of the lens system is centered upon the tangent to a generating circle of the involute curve and is rotated about the center of the generating circle to sweep the object space.

It is yet another object of the present invention to provide an improved method and apparatus for optically measuring the distance to a workpiece by varying the object space of a lens system through known dimensions wherein an object is provided for the lens system which comprises light emitting means and light sensing means positioned adjacent to the light emitting means such that it receives light which originates from the light emitting means and is retroreflected from the workpiece through the lens system.

Other objects and advantages of the invention will be apparent from the following description, the accompanying drawings and the appended claims.

BRIEF DESCRIPTION OF THE DRAWINGS

FIG. 1 is a perspecitve view of a lens system illustrating the principle of operation of the present invention.

FIG. 2 is a drawing representative of the output signal of a light detecting element of FIG. 1.

FIG. 3 is a schematic diagram illustrating the operation of the preferred embodiment of the present invention.

FIGS. 3A and 3B illustrate alternate embodiments of an object for use in the present invention.

FIGS. 3C and 3D are a perspective view and a cross-section view, respectively, of a corner cube reflector.

FIG. 4 is a perspective view of the preferred embodiment of the present invention.

FIG. 5 is a block diagram of the signal processor of FIG. 3.

DETAILED DESCRIPTION OF THE INVENTION

FIG. 1 is a perspective view of a single lens system illustrating the principle of operation of the present invention in its most elementary form. A lens 100 is positioned at a fixed location 102. An object 104 for the lens 100 comprises a light emitting element 106 and a light detecting element 108 positioned adjacent thereto. The light emitting element 106 and light detecting element 108 can comprise two branches of a bifurcated fiber optic probe or bundle with the light emitting branch coupled to a light source and the light detecting branch coupled to a light detector. The light detecting element 108 generates a voltage signal representative of the light incident thereon. A workpiece 110 is positioned on the image side of the lens 100 within a measurement zone 112 of the system.

This embodiment relies upon the principle of reversibility of optical systems. The reversibility principle requires a reflected or refracted light ray which is reversed in direction to retrace its original path. Accordingly, light which originates from the light emitting element 106 of the object 104 and is perfectly focused as an image on the workpiece 110 will be reflected or retroreflected from the workpiece 110 and travel in the reverse direction through the lens 100 to be perfectly focused upon the light emitting element 106 of the object 104. For such perfect focus, there is no suffusion or spill over of the reflected light onto adjacent areas such as the light detecting element 108.

In FIG. 1, best focus of the image 114 on the surface of the workpiece 110 is obtained when the workpiece is positioned a distance $X_2$ from the lens 100. In the position for best focus, little or none of the reflected light will be incident upon the light detecting element 108 of the object 104 and, hence, the voltage signal generated by the light detecting element 108 will be at a minimum value.

If the surface of the workpiece 110 is moved to either side of the $X_2$ position, the image 114 goes out of focus and blurs to extend beyond the limits of the best focused image. The light from such a blurred image is retroreflected to a correspondingly expanded portion of the object 104 and, hence, is no longer totally or primarily focused upon the light emitting element 106 but spills over onto the light detecting element 108. The portion of the retroreflected light which falls upon the light detecting element 108 increases the magnitude of its voltage signal. Thus, the output voltage signal of the light detecting element 108 reaches a minimum value when the surface of the workpiece 110 is positioned at $X_2$, the point of best focus within the measurement zone 112. The magnitude of the light detector output voltage signal is also reduced when the image is extremely out of focus due to the high diffusion of light retroreflected to the light detecting element 108.

As the workpiece 110 is moved through a distance $\Delta X_2$ which includes the plane or point of best focus, the output voltage signal of the light detecting element 108 is represented by one of the waveforms shown in FIG. 2. It is noted that while the level of the output voltage signal from the light detecting element 108 may change with surface characteristics, such as reflectivity, the minimum 200 of the signal occurs at the same point and corresponds to the distance of the workpiece 114 from the lens 100 at the point of best focus. Variations in signal level are indicated by the solid line and dashed line waveforms of FIG. 2 which represent differing surface reflectivities.

If instead of varying the position of the surface of the workpiece 110, variations $\Delta X_1$ in the dimension of the object space $X_1$, i.e., the optical path between the object 104 and the lens 100, are provided, then the point of focus of the image 114 is swept through the measurement zone 112 in image space. A minimum of the output voltage signal from the light detecting element 108 occurs when the image 114 is momentarily in focus upon the stationary surface of the workpiece 110. By precisely determining the object space dimension $X_1$ at the point of best focus, the position of the surface of the workpiece 110 can be precisely determined relative to the position 102 of the lens 100 to thereby determine the distance placement of the surface of the workpiece 110.

Variations in the dimension of the object space can be effected in a variety of ways. For example, the object 104 can be moved back and forth along the optical axis 116, the lens 100 can be moved axially or the object space can be varied by utilizing a vibrating mirror. Variations in the object space must be effected in a manner to avoid lateral displacement of the image on the workpiece. Such lateral displacements cause different distance measurements to be performed at different locations on the workpiece and, hence, reduce the usefulness of the device.

FIG. 3 is a schematic diagram illustrating the operation of the preferred embodiment of the present invention as shown in FIG. 4. In the schematic diagram of FIG. 3, an object 300 is provided for the lens system 302 of the optical measuring instrument. The object 300 comprises a light sensitive material, such as a photodiode, having the light sensitive surface 300A positioned toward the lens system 302. The object 300 has a small hole 300B approximately five thousandths of an inch (0.005") in diameter formed therethrough. The hole 300B can be drilled or formed by any other means capable of producing such a small hole through a photosensitive material without substantially interfering with the photosensitive characteristics of the material. To complete the object 300, light is emitted from the object 300 by focusing a light beam through the hole 300B. The light beam is formed from a light source 304 by a condensing lens 306 and a diverging lens 307. The light source 304 preferably comprises a laser. A laser provides very bright, high radiance light which is made up substantially of a single frequency. Single frequency light minimizes chromatic aberrations in the lenses of the the optical instrument.

Alternate objects 300 are contemplated in accordance with the present invention. For example, a beam splitter mirror 350 can be used with an optical fiber 352 inserted through a small hole 354 formed near the center of the mirror as shown in FIG. 3A. The optical fiber 352 transmits light from a light source such as a light emitting diode 356. Out of focus, retroreflected light is diverted to a light detector 358 by the beam splitter mirror 350 and in-focus light is transmitted back through the light emitting end of the optical fiber 352 and is thus not seen by the detector 358. Another embodiment of the object 300 can consist of the common end 380 of a bifurcated fiber optic probe 382, as shown in FIG. 3B, with one branch of the probe transmitting light from a source 384 and the other branch collecting retroreflected light and transmitting it to a detector 386. These embodiments of the object 300 may be preferred for some applications since noise can be introduced by the formation of a hole through photodiode material and also by the projection of light through such a hole. It is also possible to detect retroreflected light at other places within the lens system 302 by beam splitters or other means.

The light from the object 300 falls onto a relay lens 308. The relay lens 308 focuses the light through a hole 310 in a beam splitting mirror 312 which is silvered on the upper right hand surface as shown in FIG. 3. The hole 310 cannot be a restricting aperture for the lens system 302 but otherwise should be as small as possible. The light projected through the hole 310 by the relay lens 308 falls upon one of a plurality of mirrors 314 or convex specular surfaces which are mounted on a rotating member 316. The mirrors 314 are preferably formed such that cross sections of the mirrors substantially define involute curves 318 and are positioned upon the rotating member 316 such that the axis 320 of the lens system 302 is centered upon a tangent to an involute generating circle 322. The rotating member 316 is rotated in the counter-clockwise direction indicated by an arrow 324 about the center of the generating circle 322 by a driving motor 326. Rotation in a clockwise direction is also possible. The direction of rotation determines whether the measurement zone 112 is swept from near to far or vice versa.

It is noted that the use of spherical mirrors for the mirrors 314 serves as a close approximation to the involute curves 318 while being much less expensive to construct. It is also possible to substitute corner cube reflectors, which are well known in the art, for the mirrors 314. A corner cube reflector as shown in FIGS. 3C and 3D comprises a prism of optical quality glass having three mutually orthogonal faces which form a corner. An incoming ray of light 370 is reflected antiparallel to the direction of incidence as shown in FIGS. 3C and 3D.

The light impinging upon the mirrors 314 is reflected to the silvered surface of the beam splitting mirror 312 which directs the light to a scan lens 328. The scan lens 328 projects a final image of the object 300 into the final image space 329 where the workpiece 110 is located. As the mirrors 314 are swept along the optical axis 320 by rotation of the rotating member 316, the mirrors 314 closely simulate the motion of a true involute surface. Since the optical axis 320 is centered upon a tangent to the generating circle 322 of the involute curves 318, the variations of the dimension of the optical path created by the sweeping motion of the mirrors 314 is nearly linear in time and causes substantially no angular deflection of the light beam.

Attached to the drive shaft of the motor 326 is an angular position encoder 330. As the drive shaft of the motor 326 rotates the rotating member 316, the angular position encoder 330 generates angular displacement signals or numbers which resolve the angular displacement of the output drive shaft of the motor 326 to one thousand parts per 360° revolution or to 21.6 minutes between consecutive angular displacement signals. The output voltage signals of the light detecting surface 300A of the object 300 and the angular displacement signals from the angular position encoder 330 are passed to a signal processor 332 via conductors 334 and 336, respectively.

To increase resolution in the determination of the angular displacement of the rotating member 316 and, hence, the mirrors 314, pulses from a six megahertz clock are counted between consecutive angular displacement signals to serve as a vernier scale between the displacement signals. The vernier for the angular displacement signals is calibrated in correspondence with counts of the six megahertz clock which are recorded between at least two consecutive ones of the angular displacement signals. This calibration provides a conversion between angular displacement and time for the precise moment at which the image is focused upon the workpiece 110. Thus, the speed of rotation of the motor 326 does not have to be precisely controlled since variations in motor speed are compensated by the calibration of the vernier.

The size of the light source at the object 300; the magnifications of the relay lens 308, the mirrors 314 and the scan lens 328; and the operating f-number of these elements determine the width 202 of the valley which surrounds the minimum voltage signal 200 generated in response to light incident upon the light sensitive surface 300A (see FIG. 2). The more narrow the valley, the greater the resolution of the measurements.

In the preferred embodiment of the present invention shown in FIG. 4, various optical paths have been folded by mirrors or specular surfaces to reduce the dimensions of the optical measuring instrument to the compact unit shown. In FIG. 4, elements which correspond to elements in FIG. 3 have been given the same number but in the 400 number series.

All of the components of the preferred embodiment of the present invention are mounted on a base plate 401. A light source 404, preferably comprising a laser, emits a light beam 403 which has been expanded by diverging lens 407 and is directed by a mirror 405A to a lens 406 which focuses the light beam and projects it through a hole 400B in a light detecting element of the object 400. The light is directed through the hole 400B by a mirror 405B.

The light from the object 400 is directed to a relay lens 408 by means of deflecting mirrors 409. The relay lens 408 focuses the light through a hole 410 in a beam splitting mirror 412 which is silvered on the surface opposite to the relay lens 408. The light projected through the hole 410 by the relay lens 408 falls upon one of a plurality of mirrors 414 or convex specular surfaces which are mounted on a rotating member 416. The light impinging upon the mirrors 414, which are formed to approximate involute curves as previously described with reference to FIG. 3, is reflected to the silvered surface of the beam splitting mirror 412 which diverts the light to a scan lens 428.

The scan lens 428 projects a final image of the object 400 into the final image space 429 where a workpiece (not shown) is located. As the mirrors 414 are swept along the optical axis 420 by rotation of the rotating member 416 by a motor (not shown) which is mounted beneath the plate 401, the mirrors 414 closely simulate the motion of a true involute surface and thereby sweep the image space 429 beyond the scan lens 428. An angular displacement encoder (not shown) is coupled to the rotating member 416 to determine the angular orientation thereof as previously described with reference to FIG. 3.

Optical distance measurements in accordance with the present invention will now be described with reference to FIG. 5 which is a block diagram of the signal processor 332 of FIG. 3. As each mirror 314, 414 sweeps the object space of the scan lens 328, 428, light is retroreflected from the surface of an object within the measurement zone 329, 429 of the optical measuring instrument. As previously described, the light incident upon the light detecting element of the object 300, 400 causes the light detecting element to generate a voltage signal corresponding to the waveforms shown in FIG. 2 as the image on the workpiece goes through the plane or point of best focus. This signal is passed to the signal processor 332 via the conductor 334. Also, as the mirrors 314, 414 are being swept through the object space of the lens 328, 428, the angular position encoder 330 is generating angular displacement signals which are passed to the signal processor 332 via the conductors 336.

The voltage signal generated by the light detecting element of the object 300, 400 is passed to a controlled gain amplifier 502. The gain of the amplifier 502 is set by a microprocessor 504 to maintain an approximately fixed peak-to-peak output signal which is passed to an analog-to-digital (A/D) converter 506. The analog-to-digital converter 506 samples the analog voltage signal shown in FIG. 2 and converts the sample values to digital signals representative thereof. The digitized samples are passed from the analog-to-digital converter 506 to the data inputs of a buffer storage device 508 and to a controller 510.

The controller 510 also receives the angular displacement signals which are generated by the angular position encoder 330. The controller 510 monitors the output signals from the A/D converter 506 to determine when the output voltage signal generated by the light detecting element of the object 300, 400 is at a minimum. From an observation of the waveform shown in FIG. 2, it is noted that the minimum of the waveform occurs only after a peak value is obtained. Accordingly, the digital signals from the A/D converter 506 are compared to a minimum threshold signal. The threshold signal, for example, the threshold signal $V_1$ shown in FIG. 2, is selected to ensure that appropriate minimums of the voltage signals are being detected. The controller 510 monitors the samples from the A/D converter 506 until samples exceed the threshold signal $V_1$ and then go below the threshold signal. This signifies that a peak has occurred and that a minimum point for a valid measuring waveform will next occur.

Upon the detection of the peak of the voltage signal as just described, samples from the analog-to-digital converter 506 are taken which extend over the minimum of the voltage signal. For example, in one working embodiment of the present invention, the analog-to-digital converter 506 samples at a frequency of 375 kilohertz and 64 samples are taken to extend through the minimum point of the voltage waveform.

As previously described, the angular displacement between consecutive angular displacement signals is divided into high frequency clock counts by a vernier counter 512. The vernier counter 512 counts six megahertz clock pulses from a clock 513 and is calibrated by recording the number of six megahertz clock pulses which are recorded between four consecutive angular displacement signals. A calibrate counter 514 accumulates clock counts from the clock 513. In the preferred embodiment, the clock counts are accumulated in the calibrate counter 514 for four consecutive angular displacement signals following detection of a signal peak. This accumulated count is divided by four to arrive at a vernier count.

Upon detection of a signal peak as previously described, the following A/D converter 506 samples are loaded into the buffer storage 508. The angular displacement of the rotating member 316, 416 and, hence, the mirrors 314, 414 is precisely determined at the time of the recording of the first of the samples which are taken by storing the encoder displacement signal or number, the count within the vernier counter 512 and accumulating the clock counts for the next four consecutive angular displacement signals in the calibrate counter 514.

After a selected number of samples (64 in a working embodiment) have been taken by the A/D converter 506 and stored into the buffer storage 508, the microprocessor 504 is activated to read those sample values and the encoder angular displacement signal, the vernier count, and the calibrate count. The microprocessor 504 proceeds to determine the median voltage between the maximum voltage level sample and the minimum voltage level sample. The microprocessor 504 uses all samples which are below this median voltage to calculate the centroid of the minimum voltage valley for the voltage waveform.

Upon determination of the centroid of the minimum voltage valley, the angular displacement at the time of the occurrence of the minimum voltage valley is precisely determined by taking the encoder displacement signal from the encoder 330 together with the calibrated vernier count which is added to the angular displacement necessary to arrive at the centroid. This gives a precise angular orientation of the corresponding one of the mirrors 314, 414 upon focus of the image on the workpiece. This angular orientation can be determined on either an absolute count basis if the encoder pulses from the angular displacement encoder 330 are continuously counted or on a relative count basis if the encoder displacement pulses are counted for each of the mirrors 314, 414. In any event, an angular displacement is determined and this displacement which corresponds to a precise object space dimension is utilized to interrogate a calibration table which is stored within the microprocessor 504. The output from the table defines the distance of the workpiece from the optical distance measuring device in accordance with the present invention and is displayed on an output device 518, which can be either an analog or a digital display device.

The calibration table which is stored in the microprocessor is determined on an instrument-by-instrument basis. Precise thickness shims or gauge blocks are used to set the distance of a workpiece relative to a given optical distance measuring device. Corresponding angular displacements of the mirrors 314, 414 are generated by the instrument during calibration and correlated to the known distances to form the table. Accordingly, when an angular displacement is generated by the instrument and used to access the table, the corresponding distance is read from the table.

In view of the teachings of the present application, various modifications and alternate embodiments will be apparent to those skilled in the art. For example, it will be recognized that the object can be side-by-side light emitting and light detecting elements as shown in FIG. 1 or concentric light emitting and detecting elements as shown in FIGS. 3, 3A and 4. Many other object configurations are possible having one or more light emitting elements and one or more light detecting elements as long as there are precise dividing lines between or among the separate light emitting and detecting elements which are positioned adjacent to one another. Also, the beam splitting mirror 312, 412 can be replaced by partially silvered mirrors, a polarizing beam splitter in combination with a quarter wave plate, or other arrangements known in the art. However, the beam splitting mirror 312, 412 of the preferred embodiment provides for reduced loss of light energy and is inexpensive and straight-forward. Also, a large variety of arrangements can be envisioned to perform the detection of the minimum of the voltage signal and coordinate that minimum with the angular displacement, i.e., the dimension of the object space, of an optical instrument. These as well as other alternate embodiments and modifications are considered within the scope of the present invention.

Thus, while the methods herein described and the forms of apparatus for carrying these methods into effect constitute preferred embodiments of this invention, it is to be understood that the invention is not limited to these precise methods and forms of apparatus and that changes may be made in either without departing from the scope of the invention which is defined in the appended claims.

What is claimed is:

1. A method for measuring the position of a workpiece within a zone of measurement comprising the steps of:
    moving a specular surface within the object space of a lens system;
    forming said specular surface to substantially define an involute curve;
    mounting said specular surface for rotation such that the optical axis of said lens system is centered upon the tangent to a generating circle of said involute curve when said specular surface is rotated about the center of said involute generating circle;
    rotating said specular surface to sweep repeatedly the image space of said lens system through a corresponding distance which defines said zone of measurement;
    determining the dimensions of the object space as said image space is swept;
    positioning a light source as an object along the optical axis of said lens system;
    positioning a light detecting element to receive light retroreflected through said lens system and to generate an electrical signal representative of the light incident thereon;
    monitoring the electrical signal generated by said light detecting element to detect the minimum of said electrical signal which corresponds to the point of focus of the image of said light source upon said workpiece; and
    coordinating the point of image focus and the corresponding object space dimension to define the position of said workpiece within said zone of measurement.

2. A method for measuring the position of a workpiece within a zone of measurement comprising the steps of:
   moving a specular surface within the object space of a lens system;
   forming said specular surface to be spherical such that a cross-section of the spherical surface approximates an involute curve;
   mounting said specular surface for rotation such that the optical axis of said lens system is centered upon the tangent to a generating circle of said involute curve when said specular surface is rotated about the center of said involute generating circle;
   rotating said specular surface to sweep repeatedly the image space of said lens system through a corresponding distance which defines said zone of measurement;
   determining the dimensions of the object space as said image space is swept;
   positioning a light source as an object along the optical axis of said lens system;
   positioning a light detecting element to receive light retroreflected through said lens system and to generate an electrical signal representative of the light incident thereon;
   monitoring the electrical signal generated by said light detecting element to detect the minimum of said electrical signal which corresponds to the point of focus of the image of said light source upon said workpiece; and
   coordinating the point of image focus and the corresponding object space dimension to define the position of said workpiece within said zone of measurement.

3. The method of claim 1 wherein the step of determining the dimensions of the object space as said image space is swept comprises monitoring the angular orientation of said specular surface.

4. The method of claim 3 wherein the step of monitoring the angular orientation of said specular surface comprises the steps of:
   encoding the angular displacement of said specular surface as it is rotated to generate angular displacement signals;
   counting pulses from a high speed clock to serve as a vernier between said angular displacement signals; and
   calibrating said vernier in correspondence with clock counts recorded between at least two consecutive ones of said angular displacement signals.

5. The method of claim 4 wherein the step of coordinating the point of image focus upon said workpiece and the corresponding object space dimension to define the position of said workpiece within said zone of measurement comprises the steps of:
   forming a table to define locations of image focus within said measurement space corresponding to defined angular orientations of said specular surface; and
   reading said table upon determination of the angular orientation at the point of image focus upon said workpiece.

6. High resolution optical apparatus for measuring the distance to a workpiece from a given position in the image space of a lens system comprising:
   a lens system;
   light means positioned as the object of said lens system for emitting light;
   light sensing means positioned for receiving light emitted from said light means after it has been reflected from said workpiece and for generating an electrical signal in response to received light;
   sweep means comprising at least one specular surface within said lens system, said specular surface being formed to substantially define an involute curve and being mounted for rotation such that the optical axis of said lens system is centered upon the tangent to a generating circle of said involute curve and said sweep means further comprising drive means for rotating said specular surface about the center of said involute generating circle for effectively varying the dimensions of the object space of said lens system to thereby sweep the focused image of light emitted by said light means through a measurement zone in the image space of said lens system;
   sensing means for determining the dimensions of the object space as it is varied; and
   correlation means for determining the distance to said workpiece in response to the sensed dimension of the object space upon the detection of a minimum of said electrical signal.

7. High resolution optical apparatus for measuring the distance to a workpiece from a given position in the image space of a lens system comprising:
   a lens system;
   light means positioned as the object of said lens system for emitting light;
   light sensing means positioned for receiving light emitted from said light means after it has been reflected from said workpiece and for generating an electrical signal in response to received light;
   sweep means comprising at least one specular surface within said lens system, said specular surface being formed to be spherical such that a cross-section of the spherical surface approximates an involute curve and being mounted for rotation such that the optical axis of said lens system and said spherical surface is centered upon the tangent to a generating circle of said involute curve and said sweep means further comprising drive means for rotating said specular surface about the center of said involute generating circle for effectively varying the dimensions of the object space of said lens system to thereby sweep the focused image of light emitted by said light means through a measurement zone in the image space of said lens system;
   sensing means for determining the dimensions of the object space as it is varied; and
   correlation means for determining the distance to said workpiece in response to the sensed dimension of the object space upon the detection of a minimum of said electrical signal.

8. The optical apparatus of claim 6 wherein said sweep means comprises a plurality of specular surfaces positioned within a rotatable member such that as each of said specular surfaces sweep along said optical axis, the optical axis is centered upon the tangent to a generating circle of the involute curves approximated by the corresponding specular surfaces.

9. The optical apparatus of claim 8 wherein said light sensing means comprises a light detector positioned to receive light reflected from an angled mirror and said light means comprises a fiber optic inserted through a hole formed through said mirror whereby said light sensing means is effectively positioned adjacent to said light means.

10. The optical apparatus of claim 8 wherein said light sensing means is positioned adjacent to said light means for receiving light emitted from said light means after it has been retroreflected through said lens system from said workpiece.

11. The optical apparatus of claim 10 wherein said light sensing means comprises a section of light detecting material having a hole formed therethrough and said light means comprises a light beam projected through said hole.

12. The optical apparatus of claim 11 wherein said correlation means comprises a computer.

13. The optical apparatus of claim 10 wherein said light means and said light sensing means comprise the two branches of a bifurcated fiber optic bundle.

* * * * *